Q. D. CORLEY.
ARTIFICIAL HAND GRIP.
APPLICATION FILED NOV. 12, 1917.
1,289,400.
Patented Dec. 31, 1918.
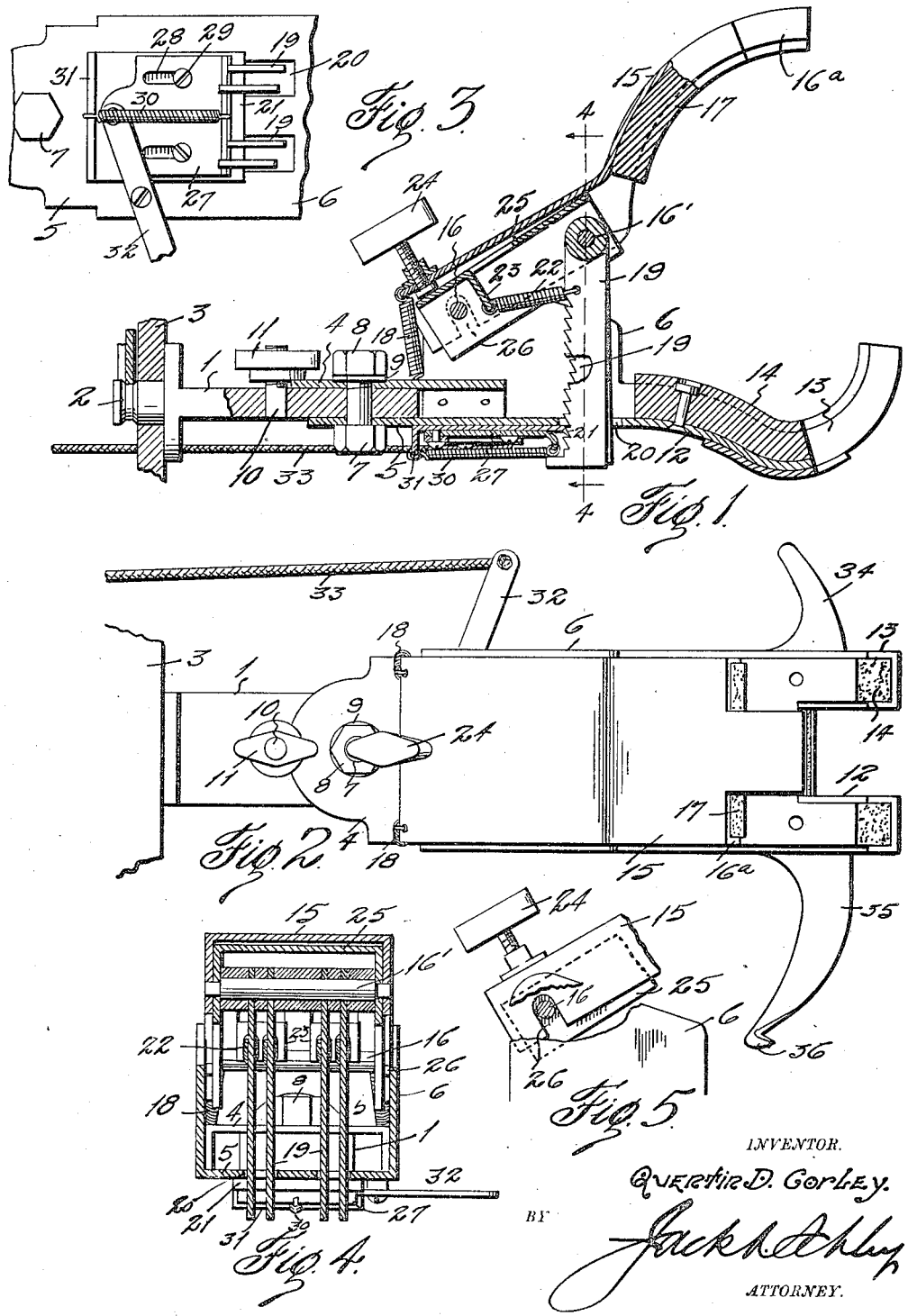
INVENTOR.
Quertin D. Corley.
ATTORNEY.

UNITED STATES PATENT OFFICE.

QUENTIN D. CORLEY, OF DALLAS, TEXAS.

ARTIFICIAL HAND-GRIP.

1,289,400.  Specification of Letters Patent.  Patented Dec. 31, 1918.

Application filed November 12, 1917. Serial No. 201,475.

*To all whom it may concern:*

Be it known that I, QUENTIN D. CORLEY, a citizen of the United States, residing at Dallas, in the county of Dallas and State of Texas, have invented certain new and useful Improvements in Artificial Hand-Grips, of which the following is a specification.

This invention pertains to improvements in artificial hand-grips.

The particular features of the invention are a pair of jaws attachable to an artificial arm for gripping handles of tools, plows, levers and other articles, together with a support whereby the jaws may be adjusted arcuately to hold the article grasped at the proper angle and means for quickly releasing the gripped article. The wearer of such a device is able to perform various operations incidental to mechanical, industrial and agricultural work.

In carrying out the invention a shank capable of rotation in an artificial cuff is provided, although this feature could be omitted; the shank however is necessary. A body member is attached to the shank by a friction hinge joint so as to remain in adjusted positions unless forcibly moved. A rigid jaw is fixed to the body member and a movable jaw is hinged to said member. The movable jaw is swung toward the fixed jaw to grip articles therebetween, fastening means holding the movable jaw in adjusted positions. Means may be provided for increasing the gripping action after the jaw has been swung. Means for quickly releasing the movable jaw and freeing the article gripped is quite essential and is employed.

The invention will be more readily understood from a perusal of the following specification and by reference to the accompanying drawings, in which an example of the invention is illustrated and wherein:

Figure 1 is a longitudinal sectional view of the device,

Fig. 2 is a plan view,

Fig. 3 is an underside detail,

Fig. 4 is a transverse sectional view on the line 4—4 of Fig. 1, and

Fig. 5 is a detail adjusting means.

In the drawings the numeral 1 designates a metal shank carrying a stud 2 adapted to be fastened in a cuff 3 and capable of rotation therein when unfastened, as is now common in this art. The shank has its outer end received between plates 4 and 5 forming part of a body member 6. The shank is flat and the plates have a substantial bearing therein. A bolt 7 is passed through the parts and carries a nut 8 which bears on a washer 9 engaging with the upper side of the plate. By this means the member 6 is hinged on the shank, but the frictional engagement of the parts is such as to require considerable pressure to move the said member, yet permitting a movement when desired. For fastening the member in different positions a bolt 10 is mounted on the shank in juxtaposition to the arcuate end of the plate 4 and has a thumb-nut 11 which bears on the plate and exerts the desired friction. This engagement may be loose enough to permit a movement of the body member and prevent the transmission of a shock to the arm of the wearer.

The body member 6 is U-shaped in cross section and has an integral jaw 12 at its outer end. This jaw is forked and provided with upstanding flanges 13 which retain a yieldable or resilient pad 14 covering the face of the jaw. A movable jaw 15 is hinged on a transverse shaft $16^a$ mounted in the sides of the member 6. This jaw also has flanges 16' for retaining a pad 17 and is shaped at its outer end to engage in the forked portion of the fixed jaw. The padded portions of the jaws are concaved so as to more readily grip a rounded article or handle.

At the rear end of the jaw 15 a pair of coiled springs 18 are attached and have their lower ends secured to the side edges of the plate 4. These springs serve to open the jaw and hold the same open. On the shaft 16' a plurality of ratchet bars 19 are pivoted and spaced apart as is shown best in Fig. 4. These bars have teeth along one vertical edge and project through slots 20 in the plate 5. The teeth on two of the bars are disposed intermediate the teeth on the others, thus giving a more minute adjustment when engaged with a dog 21 fixed to the under side of the plate 5, as will be obvious. Springs 22 extending from the bars to ears 23 tend to swing the teeth thereof into engagement with the dog.

It will be seen that the fixed jaw 12 may have its pad engaged against one side of a handle or other article and by pushing on the jaw 15, the latter may be swung into engagement with the other side of said handle or article, the ratchet bars holding the jaw 15 in this gripping position and slipping over the dog when said jaw is swung inward. The hinge joint in the shank simulates the wrist joint of the human hand and articles may be gripped and held in a natural position. If it is desired to more firmly grip the article a thumb-screw 24 mounted on the rear end of the jaw 15 is adjusted. This screw has a head on the under side of the said jaw bearing on the rear end of a yoke 25 supported on the shafts 16 and 16'. The portions of the jaw 15 which engage the shaft 16 are slotted as is best shown in Fig. 5 at 26. When the screw 24 is adjusted the shaft 16' becomes the fulcrum point of the jaw 15 and the rear or inner end of the latter is swung away from the yoke 25, whereby the gripping end of said jaw is swung into closer engagement with the article gripped.

Before releasing the jaw 15 the screw 24 is reversed to relieve the pressure. For quickly releasing the jaw 15 a detent 27 is mounted to slide against the ratchet bars 19 and push them out of engagement with dog 21, so that the springs 18 may swing the jaw 15. The detent has slots 28 receiving screws 29 whereby it is supported on the bottom of the plate 5. From the forward downturned end of the detent a coiled spring 30 extends over the latter to an ear 31 depending from said plate. A lever 32 pivoted on said plate has one end pivoted to the detent and the other end projecting laterally from the body member for receiving a cord 33. The cord is attached to the arm or shoulder of the wearer, who by a muscular movement pulls the cord and thus swings the lever, whereby the jaw 15 is released and the gripped article quickly released.

Hooks 34 and 35 project laterally from the forward or free end of the rigid jaw 12 and may be used for lifting and pulling. The hook 35 has a hook-point 36 which may be used for buttoning up clothing, picking up strings, staples and other things.

In using the device the jaws are positioned astride the article to be gripped and the jaw 15 is forced inward either with the other hand, the knee or some other member of the body. If necessary the wearer may use his mouth and teeth to turn the thumb screws. By a muscular movement a pull is exerted on the cord 33 and the parts quickly released. The hooks are useful in many ways as will be obvious to the wearer.

What I claim, is:

1. In an artificial hand-grip, the combination with a shank attachable to an artificial arm, of a support hinged to the shank and capable of arcuate adjustment, a pair of gripping jaws carried by the support, means for holding the jaws in gripping engagement with an article, means carried by the jaws for increasing the pressure of the jaws on the article gripped, and means for releasing the jaws.

2. In an artificial hand-grip, the combination with a shank attachable to an artificial arm, of a support having a friction hinge-joint connection with the shank for arcuate adjustment, a rigid jaw mounted on the support, a spring held jaw hinged on the support and swingable toward the rigid jaw, means for fastening the swingable jaw in adjusted positions with relation to the rigid jaw, and means for releasing the fastening means to free the swingable jaw.

3. In an artificial hand-grip, the combination with a shank attached to an artificial arm, of a rigid jaw carried by the shank, a swinging jaw also carried by the shank in position to be swung toward the rigid jaw to grip articles, means carried by one of the jaws and engaging the other for fastening the swinging jaw in adjusted positions with relation to the rigid jaw, means for quickly disengaging the fastening means, and resilient means engaging the swinging jaw for swinging it away from the rigid jaw.

4. In an artificial hand-grip, the combination with a shank attachable to an artificial arm, of a support having a friction hinge-joint connection with the shank for arcuate adjustment, a rigid jaw mounted on the support, a swingable jaw mounted on the support, springs tending to move the swingable jaw from the rigid jaw, ratchet bars carried by the swingable jaw and engaging the support for fastening the swingable jaw in position on gripped articles, a spring tension release acting on the ratchet bars, a lever for actuating said release, and a flexible connection secured to the lever.

5. In an artificial hand grip, the combination with a shank attachable to an artificial arm, of a support, a friction hinge-joint connecting the support with the shank, means for varying the rigidity of the hinge joint connection, a pair of gripping jaws carried by the support, means mounted on the jaws for holding the jaws in gripping engagement with an article, and means for disengaging said holding means to open the jaws and release the article held thereby.

6. In an artificial hand-grip, the combination with a supporting shank attachable to an artificial arm, and a pair of gripping jaws for gripping articles, of a friction hinge joint connecting the jaws and the shank, said joint including two members in frictional engagement whereby the parts are adjustable and are held in adjusted positions, the frictional engagement of the parts being such as to be overcome when the jaws are subjected to a sudden shock.

In testimony whereof I affix my signature.

QUENTIN D. CORLEY.